(12) United States Patent
Janes et al.

(10) Patent No.: US 12,296,523 B2
(45) Date of Patent: May 13, 2025

(54) METHOD OF FORMING A CONTAINER HAVING A HANGING IMPLEMENT

(71) Applicant: Discma AG, Hünenberg (CH)

(72) Inventors: Corey Janes, Hillsdale, MI (US); Darrel Lee, Saline, MI (US)

(73) Assignee: DISCMA AG, Hünenberg (CH)

( * ) Notice: Subject to any disclaimer, the term of this patent is extended or adjusted under 35 U.S.C. 154(b) by 129 days.

(21) Appl. No.: 18/001,608

(22) PCT Filed: Jun. 19, 2020

(86) PCT No.: PCT/IB2020/055799
§ 371 (c)(1),
(2) Date: Dec. 13, 2022

(87) PCT Pub. No.: WO2021/255505
PCT Pub. Date: Dec. 23, 2021

(65) Prior Publication Data
US 2023/0226740 A1    Jul. 20, 2023

(51) Int. Cl.
*B29C 49/12* (2006.01)
*B29C 49/04* (2006.01)
(Continued)

(52) U.S. Cl.
CPC ........ *B29C 49/12* (2013.01); *B29C 49/04102* (2022.05); *B29C 49/06* (2013.01);
(Continued)

(58) Field of Classification Search
CPC .......... B29C 49/482; B29C 2049/4664; B29C 49/58
See application file for complete search history.

(56) References Cited

U.S. PATENT DOCUMENTS

| 4,395,378 A | 7/1983 | Alberghini et al. |
| 5,403,538 A * | 4/1995 | Maeda .................. B29C 49/482 |
| | | 425/525 |

(Continued)

FOREIGN PATENT DOCUMENTS

| EP | 2716430 A1 | 4/2014 |
| JP | 2003080588 A | 3/2003 |
| JP | 3467300 B2 | 11/2003 |

OTHER PUBLICATIONS

Taku (English Translation of JP4774660) (Year: 2011).*

*Primary Examiner* — Michael A Tolin
*Assistant Examiner* — Hana C Page
(74) *Attorney, Agent, or Firm* — Michael E. Dockins

(57) ABSTRACT

Ways to produce a container (315, 415, 515, 720, 815, 915) having a shaped tail (610, 910) are provided that include blow molding a precursor having a tail (105, 110, 205, 310, 410, 510, 715, 810, 910) and shaping the tail (105, 110, 205, 310, 410, 510, 715, 810, 910) to form the shaped tail (610, 910). Various types of blow molding can employ various types of precursors having tails (510). Injection blow molding can be used where a preform (105, 200, 305, 405, 505) having a tail (105, 110, 205, 310, 410, 510, 715, 810, 910) is optionally longitudinally stretched and is expanded with a gas or a liquid. Extrusion blow molding can be used where a parison (705) having a tail (105, 110, 205, 310, 410, 510, 715, 810, 910) is expanded. A tail (105, 110, 205, 310, 410, 510, 715, 810, 910) shaping means can be part of the blow molding process or can be employed after the container (315, 415, 515, 720, 815, 915) is produced from the precursor having the tail (105, 110, 205, 310, 410, 510, 715, 810, 910). The shaped tail (610, 910) can impart functionality to the container (315, 415, 515, 720, 815, 915), including where the tail (105, 110, 205, 310, 410, 510, 715,

(Continued)

810, 910) is shaped into a coupling point that can serve as an attachment point, hanging point, or hook, for example.

15 Claims, 9 Drawing Sheets

(51) Int. Cl.
  *B29C 49/06* (2006.01)
  *B29C 49/08* (2006.01)
  *B29C 49/42* (2006.01)
  *B29C 49/46* (2006.01)
  *B29C 49/48* (2006.01)
  *B29L 31/00* (2006.01)

(52) U.S. Cl.
  CPC ........ *B29C 49/086* (2022.05); *B29C 49/4283* (2022.05); *B29C 49/46* (2013.01); *B29C 49/4802* (2013.01); *B29C 2049/4602* (2013.01); *B29C 2049/4882* (2013.01); *B29C 2791/001* (2013.01); *B29C 2949/078* (2022.05); *B29L 2031/7158* (2013.01)

(56) References Cited

U.S. PATENT DOCUMENTS

| | | | |
|---|---|---|---|
| 5,540,579 A * | 7/1996 | Uehara | B29C 49/071 |
| | | | 425/DIG. 58 |
| 9,802,375 B2 * | 10/2017 | Lisch | B29C 49/14 |
| 2010/0262114 A1 * | 10/2010 | Brandenburger | B29B 11/14 |
| | | | 264/513 |
| 2014/0054829 A1 * | 2/2014 | Poo | B29B 11/14 |
| | | | 264/533 |
| 2015/0231815 A1 | 8/2015 | Shoham | |
| 2016/0136867 A1 | 5/2016 | Mahrle et al. | |
| 2017/0129158 A1 * | 5/2017 | Miyazawa | B29C 49/4252 |
| 2022/0134630 A1 * | 5/2022 | Maruyama | B29B 11/08 |
| | | | 264/534 |

* cited by examiner

METHOD OF FORMING A CONTAINER HAVING A HANGING IMPLEMENT

FIELD

The present technology relates to simultaneously forming and filling a container from a preform using a product, where the preform includes an exterior feature that is configured as a hanging implement in the resultant product-filled container.

INTRODUCTION

This section provides background information related to the present disclosure which is not necessarily prior art.

Various products are distributed in plastic containers, such as containers formed from one or more polymers. Common polymers used to form containers include polyesters, such as polyethylene terephthalate (PET), high and low density polyethylenes, polycarbonate, and polypropylene, among others. Plastic containers can be made using various blow molding processes including injection blow molding, liquid or hydraulic blow molding, and extrusion blow molding.

Injection blow molding can be used to form certain plastic containers in one or more stages and can include use of a stretch rod. In a two-stage injection stretch blow molding process, the plastic is first molded into a preform using an injection molding process. The preform can include the neck and finish of the container to be formed, which can include threading thereon, and a closed distal end. The preform can then be heated above the plastic glass transition temperature, optionally stretched longitudinally with a stretch rod, and blown using high-pressure gas (e.g., air) into a container conforming to a mold. As the preform is inflated, it elongates and stretches, taking on the shape of the mold cavity. The plastic solidifies upon contacting the cooler surface of the mold and the finished hollow container is subsequently ejected from the mold.

Liquid or hydraulic blow molding can form and fill a container in a single operation. A liquid product can be used to form and fill a preform into a resultant container, where the liquid product remains thereafter in the finished container. A heated preform, much like the preform used in injection blow molding, can be placed within a mold, optionally stretched, and rapidly filled using a liquid product instead of a gas to form a container therefrom. Combination of the forming and filling steps can therefore optimize packaging of a liquid product by eliminating the transport of empty containers and time demands related to subsequent filling operations.

Extrusion blow molding can be used to form certain plastic containers where a continuously extruded hot plastic tube or parison is captured within a mold and inflated against the inner surfaces of the mold to form a container blank. The mold can be designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion.

Preforms used in injection blow molding and liquid blow molding or parisons used in extrusion blow molding can have a tail extending therefrom. For example, a preform can be formed by injection molding, where molten plastic is fed to a preform mold, the inlet to the preform mold including a channel, runner, or sprue delivering molten plastic from an extruder. Depending on the configuration of the channel and presence or location of one or more gates, the preform can include a tail extending from a point at which the molten plastic was injected into the preform mold. Likewise, when a mold captures and squeezes a hot plastic tube or parison in extrusion blow molding, a base where the parison is squeezed can result in a tail extending from the parison and from the subsequently blown container. Effort is often made to minimize any tail or extending plastic in making or forming a preform or parison, as such is typically viewed as wasted plastic material. Such tail or sprue residue, even if minimized in forming the preform or parison, can also require post-forming processing by cutting or trimming to remove what are often viewed as surface imperfections or features that may interfere with the resultant container aesthetic and/or performance.

The present technology, conversely, seeks to convert the tail feature of a preform or parison into a useful functionality, such as a coupling point that can serve as an attachment point, hanging point, or hook, for example. Instead of configuring blow molding systems to minimize the presence of a preform or parison tail feature, and/or require post-formation processing of preforms or containers produced therefrom, the present technology deliberately provides a tail that can be shaped to complement the function of certain containers. The shaped tail can be positioned opposite an opening of the container, so that when the container is hanging from the shaped tail, contents thereof can be pulled by gravity toward the opening. In this way, the container can be stored in a position where a viscous product contained therein is maintained near a capped opening to facilitate efficient dispensing of the product.

SUMMARY

The present technology includes systems, processes, and articles of manufacture that relate to a container formed and filled from a preform using a product, where the preform included an exterior feature that is formed into a hanging implement in the resultant product-filled container.

Ways are provided to produce a container having a shaped tail that include blow molding a precursor having a tail and shaping the tail to form the shaped tail. Shaping the tail can occur during the blow molding or thereafter in order to produce the container having the shaped tail. Blow molding can comprise injection blow molding and the precursor can comprise a preform having the tail, where the blow molding can optionally include longitudinal stretching of the preform having the tail. Blow molding can include injection blow molding using a gas or using a liquid product that remains within the container as an end product. Blow molding can comprise extrusion blow molding and the precursor can comprise a parison having the tail. Shaping the tail to form the shaped tail can include engaging the tail with a tail shaping means, which can comprise a portion of a mold used to produce the container and where the tail is engaged by the tail shaping means while the precursor having the tail is blow molded to produce the container having the shaped tail. Shaping the tail to form the shaped tail can include engaging the tail with the tail shaping means after the precursor having the tail is blow molded to produce the container. The tail shaping means can shape the tail into a coupling means, such as a hanging point or hook.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
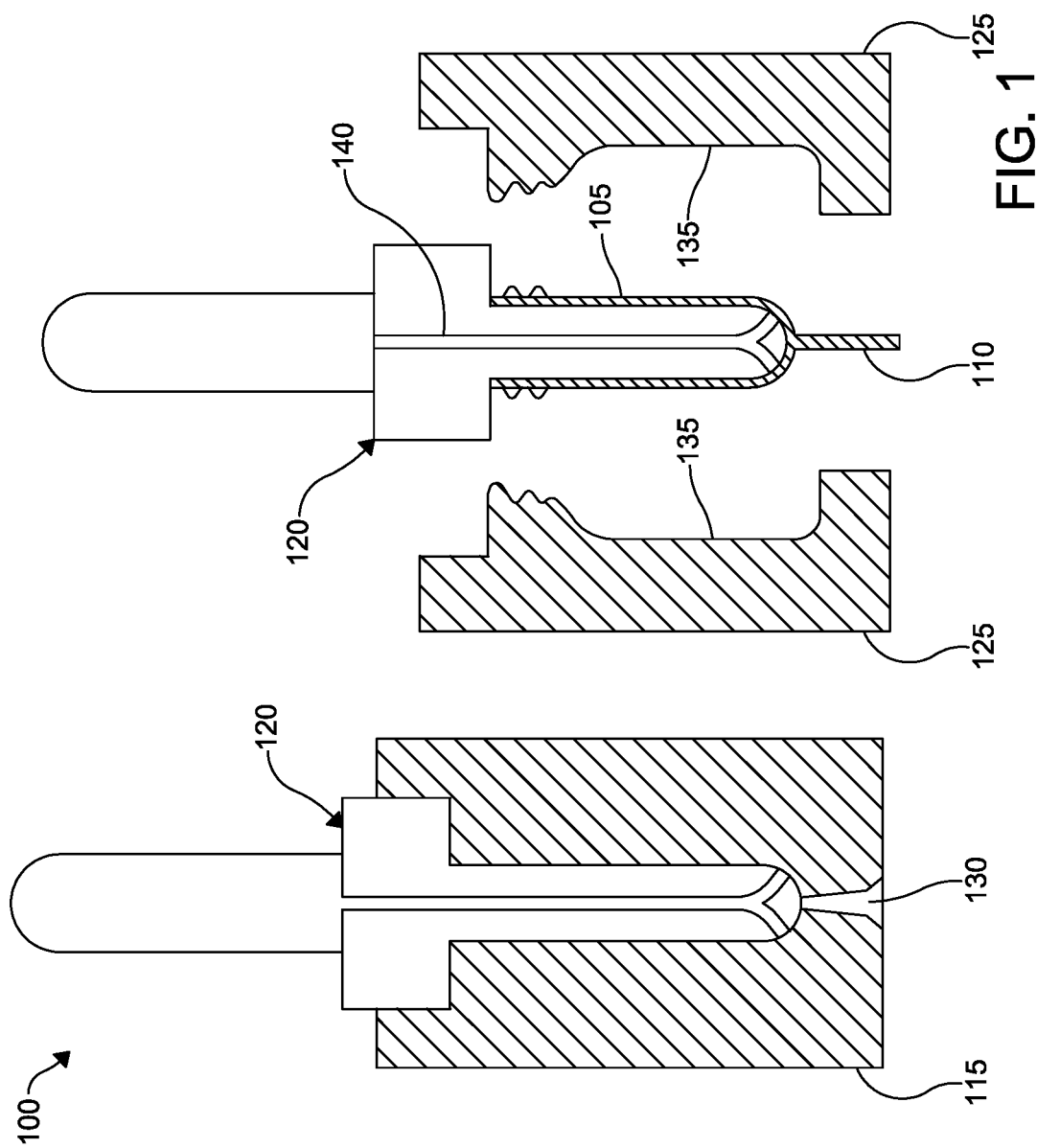
FIG. 1 illustrates a scheme for injection molding a preform having a tail using a preform mold and blowing stick, where the preform having a tail along with the blowing stick are loaded into a mold for subsequent injection blow molding of a container having the tail.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology converts a tail feature of a preform or parison into a useful functionality, such as a coupling point that can serve as an attachment point, hanging point, or hook in the resultant container, for example. The blow molding art has typically sought to minimize the presence of a preform or parison tail feature whereas the present technology deliberately provides a tail that can be shaped to complement the function of certain containers. The shaped tail can be positioned opposite an opening of the container allowing the container to depend from the shaped tail so that contents can be pulled by gravity toward the opening. In this way, the container can be stored in a position where a viscous product contained therein is maintained near the opening to facilitate efficient dispensing of the product. A container having a shaped tail is accordingly provided by blow molding a precursor having a tail and shaping the tail to form the shaped tail, to thereby produce the container having the shaped tail.

Various types of blow molding operations can be employed. Blow molding can include injection blow molding where the precursor includes a preform having the tail. The blow molding operation can optionally include longitudinal stretching of the preform having the tail; e.g., injection stretch blow molding using a stretch rod to longitudinally extend the preform prior or concomitant with expansion of the preform to conform to a container mold. Blow molding can include injection of a gas into the preform to inflate the preform or injection of a liquid product to expand the preform, where the liquid product can remain within the container as an end product. Blow molding can include extrusion blow molding where the precursor can include a parison having the tail. For example, the precursor can be formed from a parison of an extruded tube that is captured within a mold, one end of the tube being engaged by the mold to form a tail from the parison.

There are various ways to form the shaped tail. Shaping the tail to form the shaped tail can include engaging the tail with a tail shaping means. In certain embodiments, the tail shaping means includes a portion of a mold used to produce the container. The tail can be engaged by the tail shaping means while the precursor having the tail is blow molded to produce the container having the shaped tail. The tail can also be engaged with the tail shaping means after the precursor having the tail is blow molded to produce the container.

In certain embodiments, the tail shaping means includes a channel that receives and directs the tail into the shaped tail to produce the container having the shaped tail. The channel can have an open side allowing the shaped tail to be removed therefrom. The channel can also be heated or cooled to facilitate shaping and setting the structure of the shaped tail. The channel can also take the form of a surface, including a groove or curved surface, against which the tail is contacted so that at least a portion of the tail deviates from a longitudinal axis of the container to form the shaped tail.

In certain embodiments, the tail shaping means can include two members having complementary surfaces that engage the tail therebetween and apply a compressive force thereto to produce the container having the shaped tail. For example, a portion of the tail can be worked or compressed against a mandrel or formed to impart the desired shape to the shaped tail structure. Clamping action between two or more components can fashion the tail into a coupling means, such as a hook, for example. One or more members of the tail shaping means can also be heated or cooled to facilitate shaping and setting the structure of the shaped tail.

In certain embodiments, the tail shaping means shapes the tail so that at least a portion of the shaped tail deviates from a longitudinal axis of the container. The tail can be shaped into various structures, including various coupling means such as a hanging point or a hook. Where the resultant container has the shaped tail positioned opposite an opening of the container, the container can be stored depending from the shaped tail to allow any product contained therein to be drawn by gravity toward the opening. The opening can be sealed in various ways, including various valves, threaded or snap caps, flip caps, etc. Dispensing efficiency of product can therefore be maximized. For example, the container can be filled with various viscous products, such as shampoo or conditioner, adhesives, paste-like foodstuffs, etc., which can then be displayed and/or stored hanging from the shaped tail.

The present technology further contemplates various containers having shaped tails produced by the processes described herein. Likewise, various blow molding systems for producing a container having a shaped tail and ways of using such systems are provided by the present technology. Various articles of manufacture are included, such as molds, tail shaping means, preforms, parisons, and containers. The present technology also includes various systems and system components having the features provided herein. Various articles of manufacture are provided by the present technology, including various products-by-process.

With reference now to the several figures provided herewith, non-limiting aspects of various embodiments of the present technology are illustrated.

Figure 3:
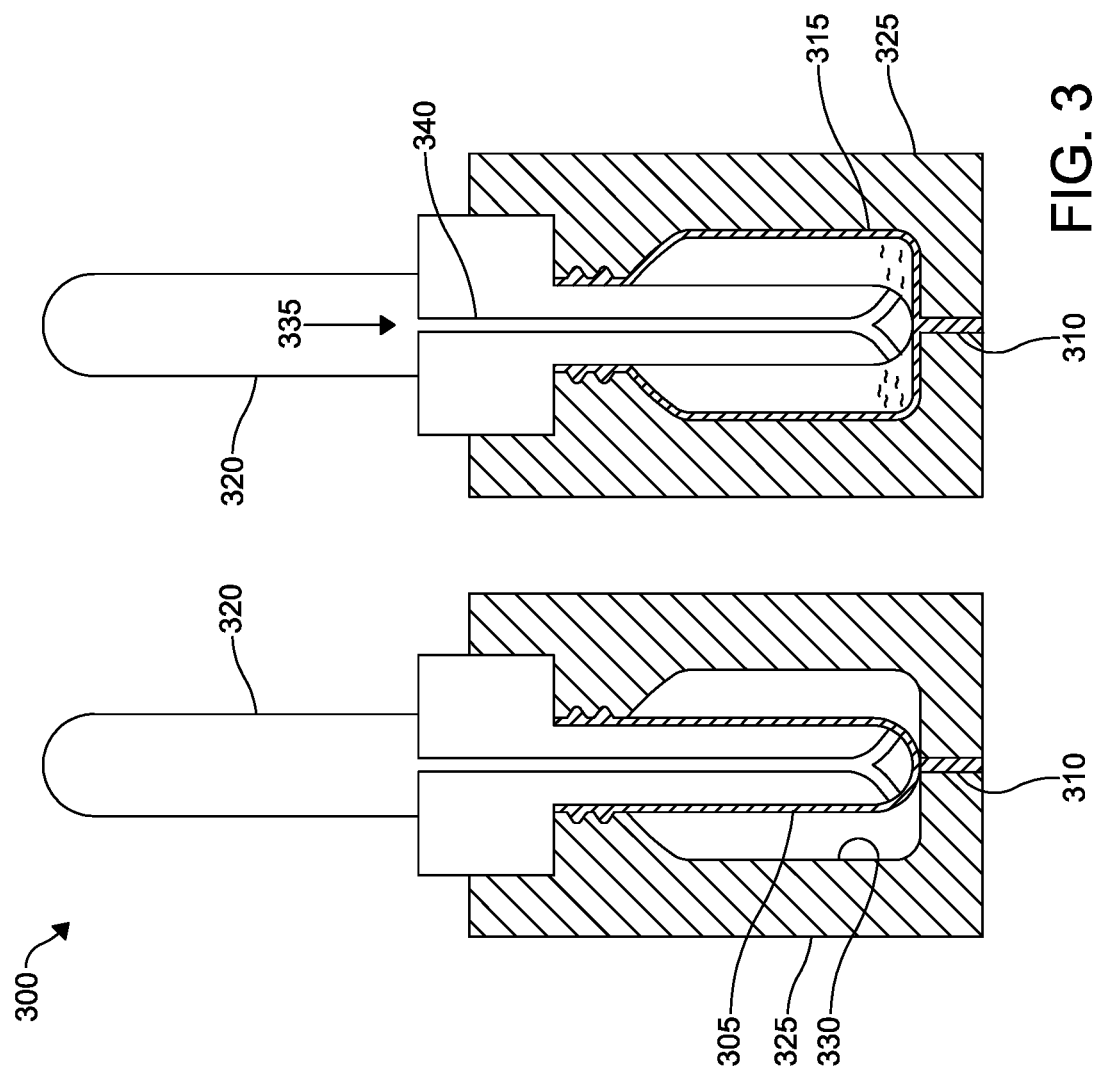
FIG. 3 illustrates a scheme for injection blow molding of a preform having a tail into a container having the tail.

FIG. 1 illustrates a scheme 100 for injection molding a preform 105 having a tail 110 using an injection mold 115 and blowing stick 120, where the preform 105 having the tail 110 along with the blowing stick 120 can be loaded into a blow mold 125 for subsequent blow molding of a container having the tail; e.g., see FIG. 3. In the left side of FIG. 1, the blowing stick 120 is loaded into the injection mold 115, where a material (e.g., PET) is injection molded through port 125 to form the preform 105 having the tail 110, the preform 105 formed in-between and about a portion of the blowing stick 120 and the injection mold 115. The tail 110 can include part of a sprue at injection gate located at the port 130, for example. The blow stick 120 including the preform 105 having the tail 110 is then moved into the blow mold 125, as shown on the right side of FIG. 1, where halves of the blow mold 125 close about the preform 105 on the blowing stick 120, the blow mold 125 having an interior surface 135 determining the configuration of the subsequently blow molded container. As shown, the blowing stick 120 includes a passage 140 therethrough for introducing a fluid (e.g., a gas or liquid) and blow molding the preform 105 having the tail 110 into a resultant container having the tail 110; e.g., see FIG. 3.

Figure 2:
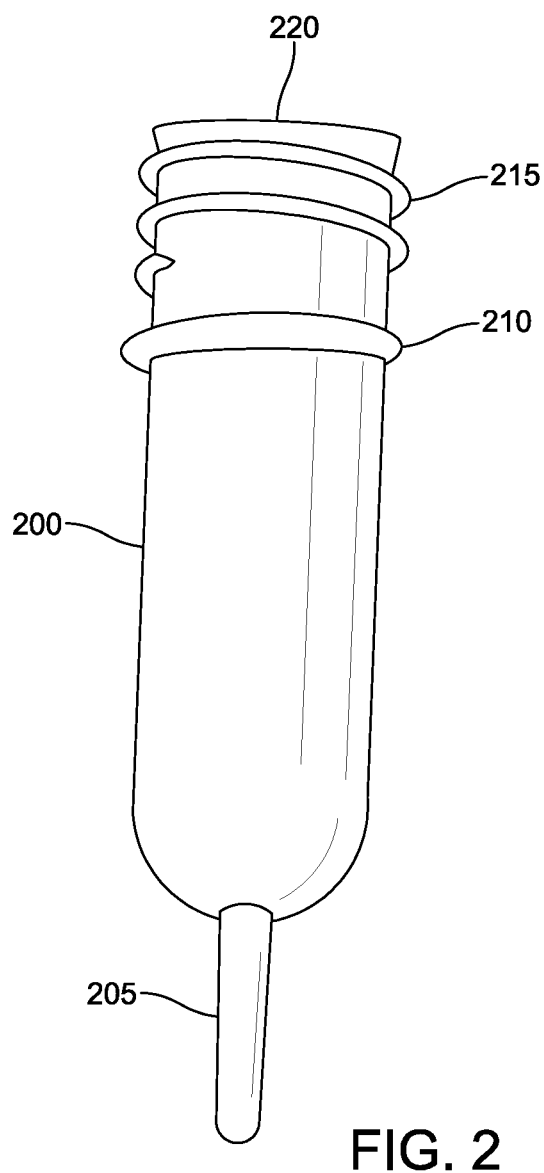
FIG. 2 illustrates a preform having a tail made by injection molding.

FIG. 2 illustrates a preform 200 having a tail 205 made by injection molding, such as shown in scheme 100 of FIG. 1. Preforms 200 can be formed by various injection blow molding methods, employing one or more injection molds 115 and blowing sticks 120 as shown in FIG. 1, and by other injection molding methods that do not include blowing sticks 120. The embodiment of the preform 200 shown includes the tail 105, a support ring 210, and a threaded finish 215 proximate an open end 220 thereof. As such, the embodiment of the preform 200 depicted is generally a hollow cylinder formed by injection molding from one end having the tail 205 and subsequently blow molded at the other open end 220. It is possible, however, to configure the preform 200 as other shapes, to have the tail 205 located at other positions on the preform, and configure the support ring 210 and finish 215 in other ways.

FIG. 3 illustrates a scheme 300 for blow molding of a preform 305 having a tail 310 into a container 315 having the tail 310. The left side of scheme 300 shows the preform 305 on a blowing stick 320 loaded into a blow mold 325 closed about the preform 305 and tail 310. An interior surface 330 of the blow mold 325 defines the configuration of the resultant blow molded container 315. The right side of scheme 300 shows a fluid 335 being injected through a passage 340 in the blowing stick 320 to expand the preform 305 to contact the interior surface 330 of the blow mold 325. Halves of the blow mold 325 can be separated, e.g. as shown for blow mold 125 in FIG. 1, and the container 315 having the tail 310 can be removed therefrom.

Figure 4:
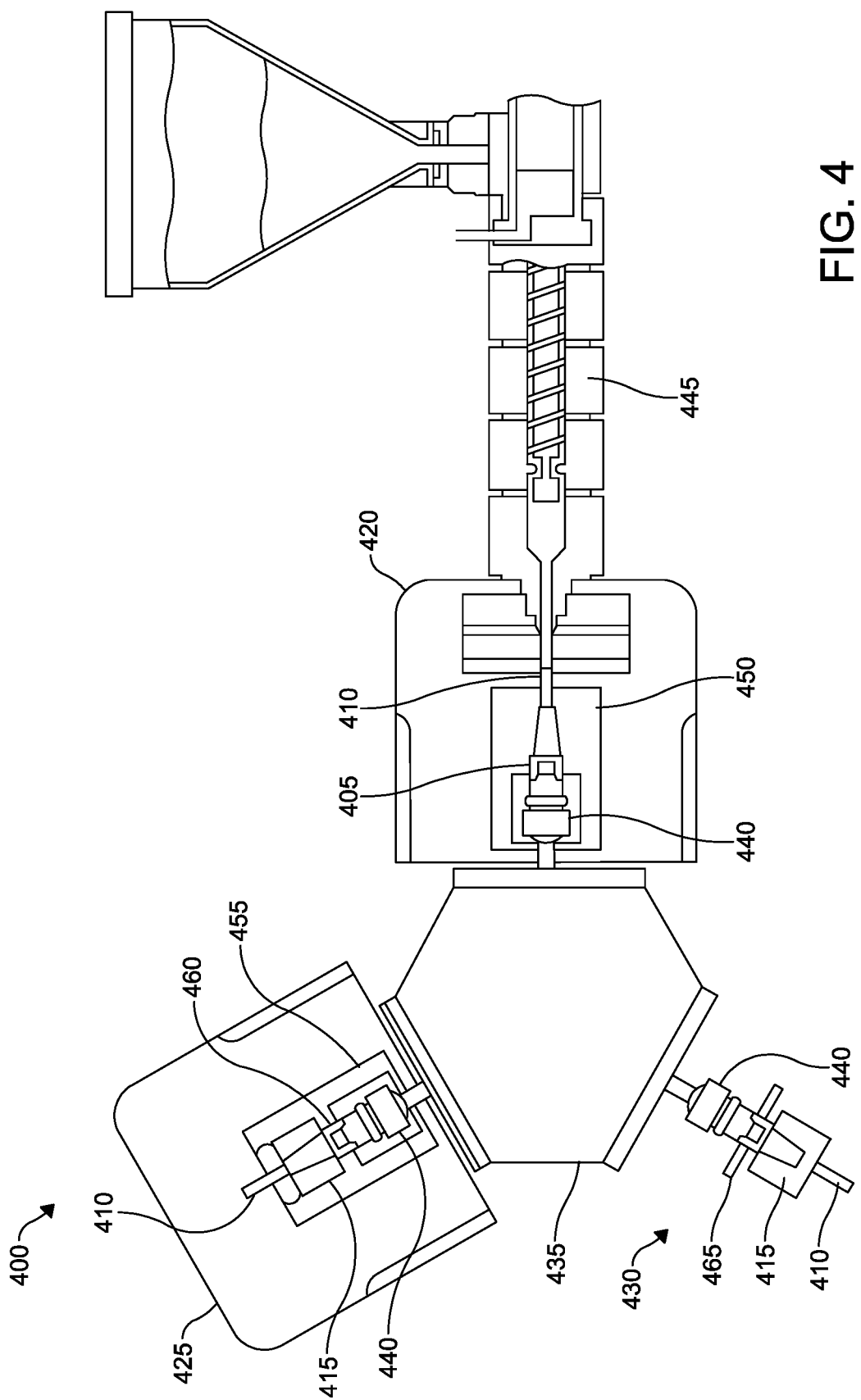
FIG. 4 illustrates a three-stage rotary injection blow molding system that forms and uses a preform having a tail to produce a container or bottle having the tail.

FIG. 4 illustrates a three-stage rotary injection blow molding system 400 that forms and uses a preform 405 having a tail 410 to produce a container or bottle 415 having the tail 410. The system 400 includes a preform injection molding station 420, a blow molding station 425, and a removal station 430 that can be sequentially interfaced using a transfer head 435 to index one or more blowing sticks 440 at each station 420, 425, 430. At the preform injection molding station 420, a reciprocating screw extruder 445 is used to injection mold the preform 405 having the tail 410 about a portion of the blowing stick 440 located within an injection mold 450. At the blow molding station 425, the blowing stick 440 with the preform 405 having the tail 410 is placed within a blow mold 455 and a fluid is injected through a passage 455 within the blowing stick 440 to expand the preform 405 to conform to the blow mold 455 and form the container 415 having the tail 410. At the removal station 430, a removal plate 465 is used to discharge the container 415 having the tail 410 from the blowing stick 440. The blowing stick 440 is then returned to the preform injection molding station 420. The system 400 can operate progressively, with each station 420, 425, 430 operating substantially simultaneously to produce a container 415 having a tail 410 every cycle following completion of the first cycle. For example, the transfer head 435 can have one or more blowing sticks 440 that are rotated thereby so that one or more preforms 405 each having a tail 410 are injection molded, one or more preforms 405 each having a tail 410 are blow molded to form one or more containers 415 each having a tail 410, and one or more containers 415 each having a tail 410 are removed at the respective stations 420, 425, 430.

Figure 5:
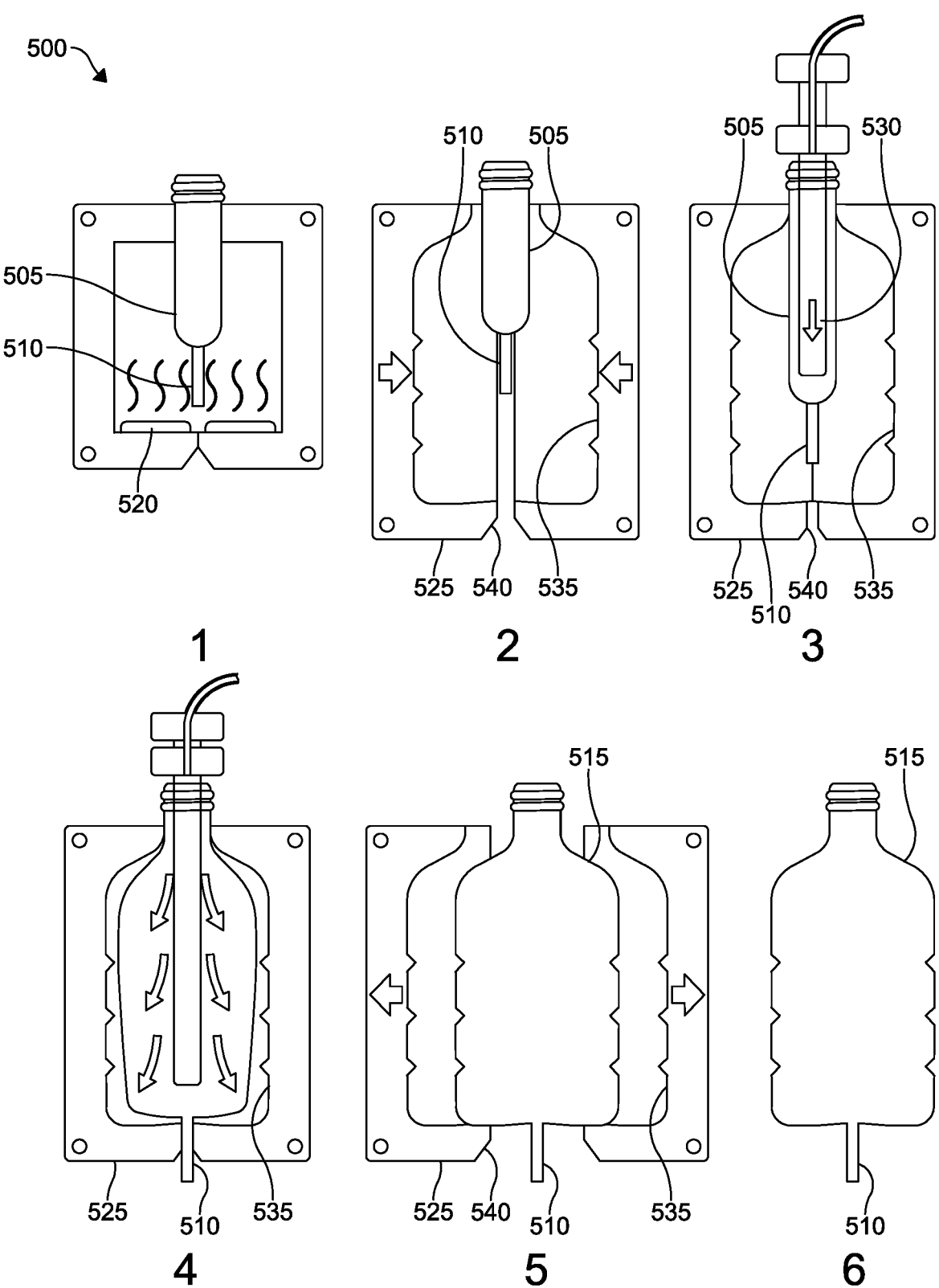
FIG. 5 illustrates a scheme for injection stretch blow molding of a preform having the tail into a container having the tail.

FIG. 5 illustrates a scheme 500 for injection stretch blow molding of a preform 505 having a tail 510 into a container 515 having the tail 510. In a first stage, the preform 505 having the tail 510 is heated using a heat source 520. The preform 505 having the tail 510 can be formed by injection molding as shown in FIG. 1, for example. In a second stage, the heated preform 505 having the tail 510 is disposed within a blow mold 525, where the blow mold 525 includes two halves that are closed about the heated preform 505 having the tail 510. In a third stage, the heated preform 505 having the tail 510 is stretched in a longitudinal direction by a stretch rod 530. The stretch rod 530 can have a passageway therethrough that can have one or more exit ports allowing a fluid to be injected into the stretched preform having the tail 510, as shown in the fourth stage. The injected fluid expands the preform 505 to contact and conform to an interior surface 535 of the blow mold 525, forming the container 515 having the tail 510. During the third stage and/or the fourth stage, the tail 510 can be directed to and received within a recess 540 of the blow mold 520. As shown, the recess 540 can be formed between the two halves of the blow mold 525. In a fifth stage, the preform having the tail 510 is fully expanded into the container 515 having the tail 510 and the blow mold 525 halves are separated so that the container 515 can be removed therefrom. The sixth stage shows the resultant container 515 having the tail 510 removed from the blow mold 525.

Figure 6:
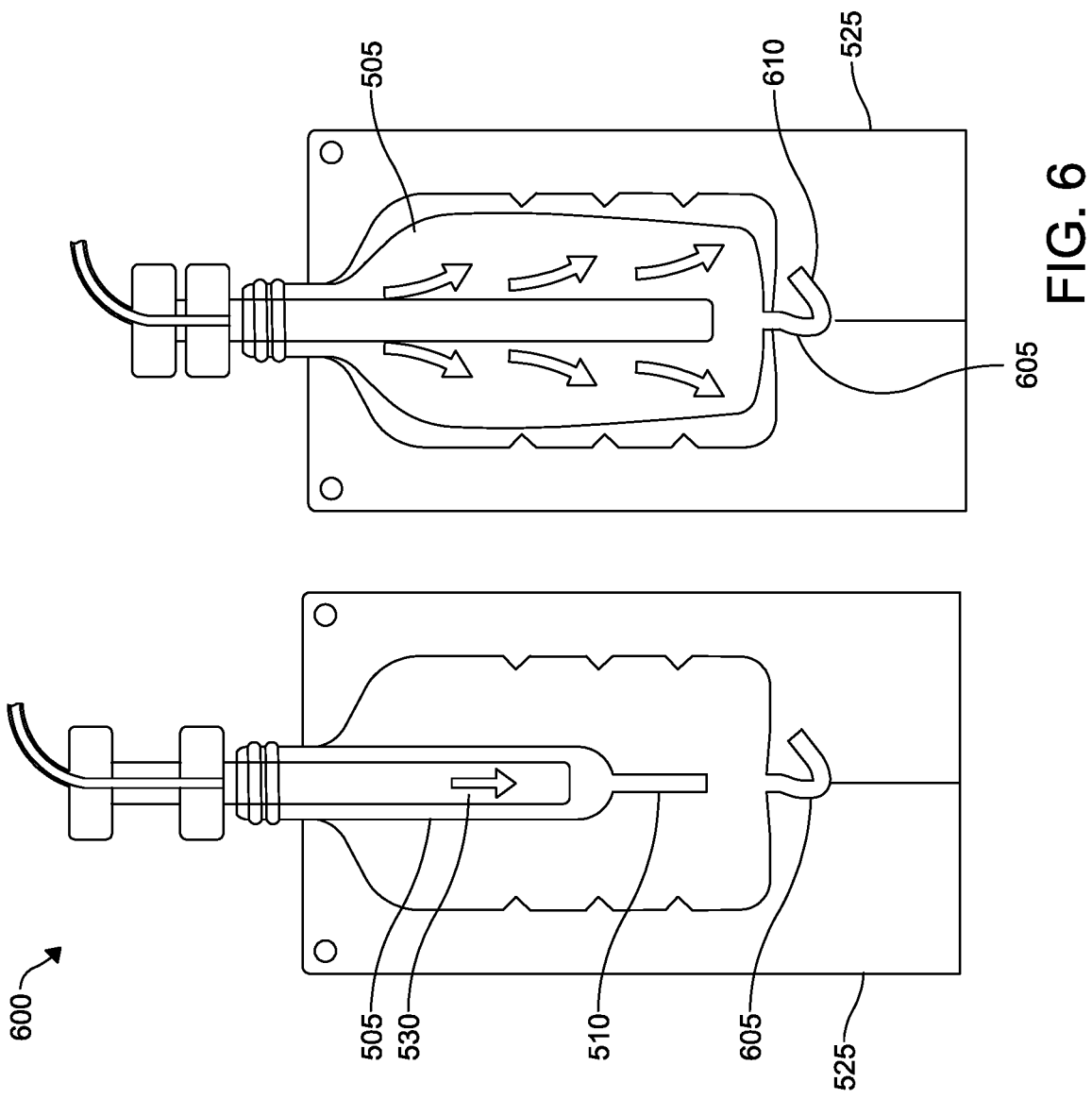
FIG. 6 illustrates a modified version of the scheme shown in FIG. 5, where the mold for stretch blow molding of the preform having the tail includes a tail shaping means configured to receive and shape the tail during the stretch blow molding process.

FIG. 6 illustrates a modified scheme 600 of the third and fourth stages of the scheme 500 shown in FIG. 5, where the blow mold 525 for injection stretch blow molding of the preform 505 having the tail 510 includes a tail shaping means 605 configured to receive and shape the tail 510 during the stretch blow molding process. The tail shaping means 605 replaces the recess 540 from FIG. 5 and serves to shape the tail 510 as the tail 510 is directed and received therein during the third stage and/or the fourth stage. As shown in FIG. 6, the tail shaping means 605 receives and shapes the tail 510 into a shaped tail 610. The shaped tail 610 shown generally forms a hook-shape, but other shapes and forms can be employed, including where the tail shaping means 605 can be of various sizes and lengths to accommodate various tails 510 and conform such into various types of shaped tails 610.

Figure 7:
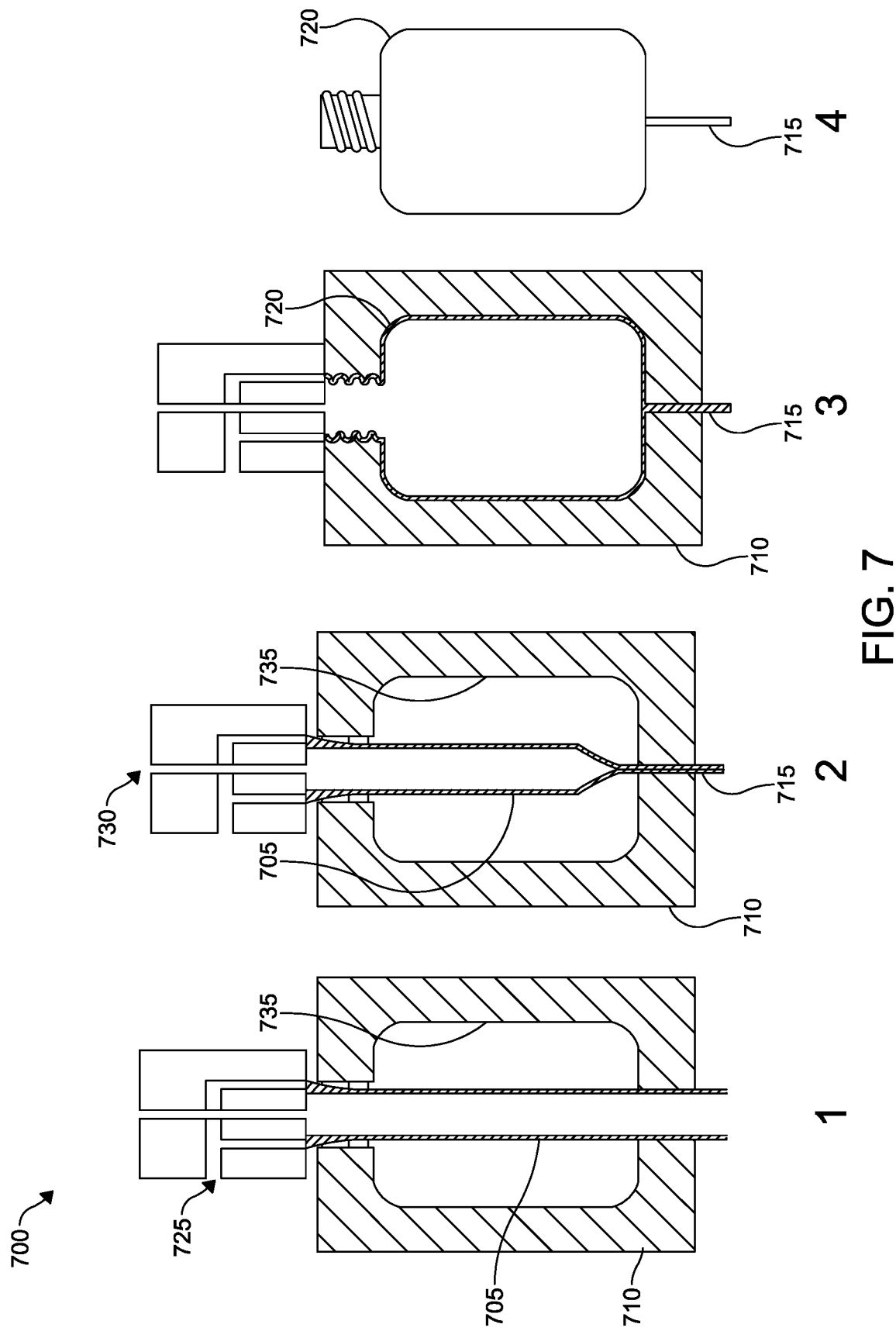
FIG. 7 illustrates a scheme for extrusion blow molding where a parison is captured in mold that results in the parison having a tail and subsequent blow molding thereof results in a container having the tail.

FIG. 7 illustrates a scheme 700 for extrusion blow molding where a parison 705 is captured in a blow mold 710 in a way that results in the parison 705 having a tail 715 and subsequent blow molding thereof results in a container 720 having the tail 715. In a first stage, a material (e.g., PET) is extruded at 725 to form a continuous and hollow tube-like structure that forms the parison 705. In a second stage, a base of the parison 705 is captured and squeezed by the blow mold 710 to close an end of the parison 705 and form the tail 715. A fluid (e.g., air) is injected into the parison 705 at 730 to expand the parison 705 having the tail 715 to conform to an interior surface 735 of the blow mold 710 and form the container 720 having the tail 715. As can be seen in the third stage, the parison 705 is fully expanded to form the container 720 inside the blow mold 710. The fourth stage depicts the resultant container 720 having the tail 715 removed from the blow mold 710.

Figure 8:
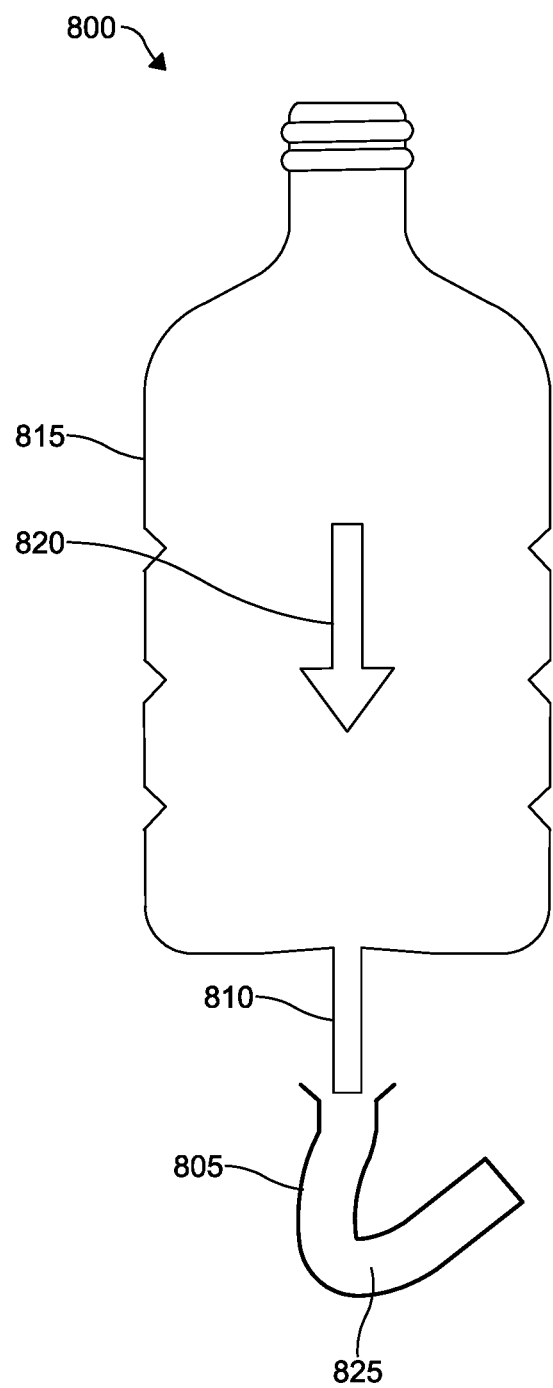
FIG. 8 illustrates one embodiment of a tail shaping means engaging a tail on a container.

FIG. 8 illustrates one embodiment 800 of a tail shaping means 805 engaging a tail 810 on a container 815. Here, the container 815 having the tail 810 is moved as depicted by arrow 820 so that the tail 810 is received by the tail shaping means 805. Alternatively, the tail shaping means 805 can be moved to engage the container 815 having the tail 810. Pressure and/or heat can be applied to the tail 810 and/or the tail shaping means 805 so that the tail 810 conforms to a structure imposed by the tail shaping means 815. For example, where the tail 810 includes a thermoplastic material such as PET, application of heat, pressure, and force can cause the tail 810 to conform to a shape or structure imposed by the tail shaping means 805 and retain that shape or structure upon cooling and/or removal of the pressure or force. The embodiment of the tail shaping means 805 depicted includes a hook-shaped channel 825 that causes the tail 810 to form a hook-shaped tail.

Figure 9:
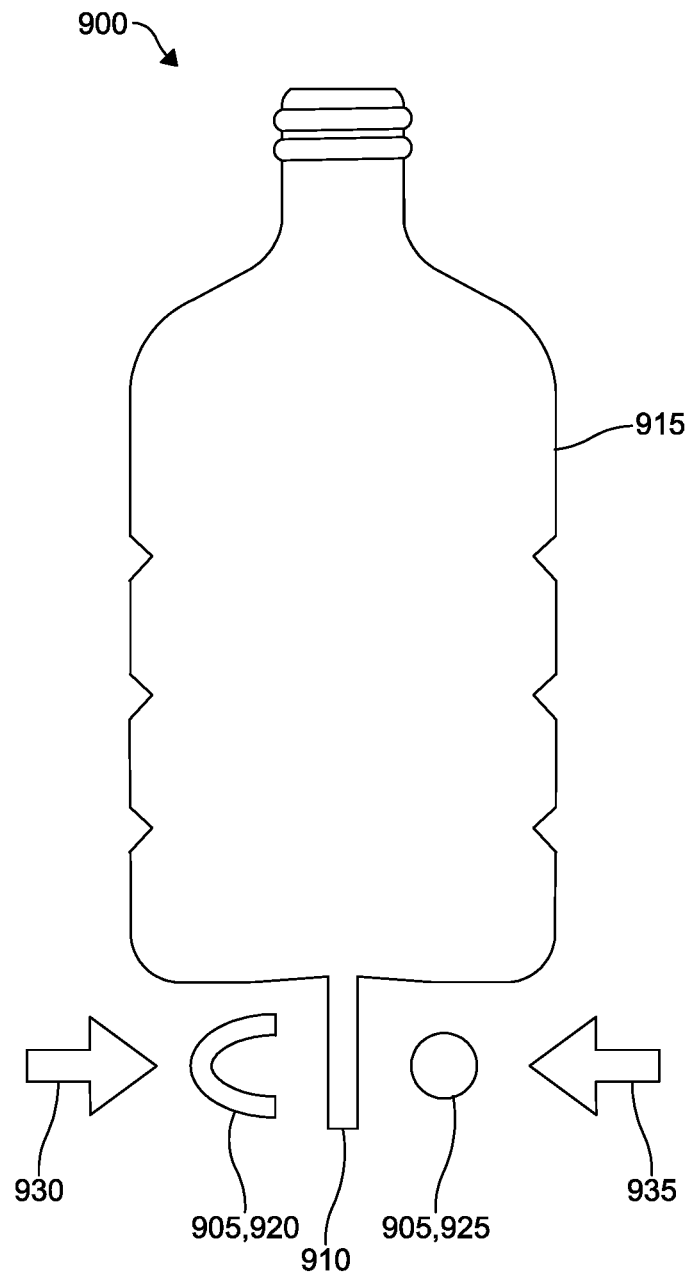
FIG. 9 illustrates another embodiment of a tail shaping means engaging a tail on a container.

FIG. 9 illustrates another embodiment 900 of a tail shaping means 905 engaging a tail 910 on a container 915. Here, the tail shaping means 905 includes a multi-part molding operation that presses the tail 910 between a first mold part 920 and a second mold part 925 as indicated by respective arrows 930, 935. Heat and/or pressure can be applied by the first mold part 920 and the second mold part 925 to the tail 910, resulting in the tail conforming to a shaped tail complimentary to contact surfaces of the first mold part 920 and the second mold part 925. The embodiment of the tail shaping means 905 shown that includes the first mold part 920 and the second mold part 925 results in a curve being formed in the shaped tail 910, where the shaped tail can hence have a hook-shape imparted thereto.

As these examples illustrate, the presently described methods and systems can produce a container having a shaped tail by blow molding a precursor having a tail and shaping the tail to form the shaped tail. However, it is understood that the present technology can be used in conjunction with other container manufacturing methods and can be used with various precursor and container materials including, for example, thermoplastic, high density polyethylene, polypropylene, polyethylene naphthalate (PEN), a PET/PEN blend or copolymer, and various multi-layer structures may be suitable for the manufacture of plastic containers and used in connection with the principles described herein. While the present disclosure contemplates the production of PET containers, it is understood that other polyolefin materials (e.g., polyethylene, polypropylene, polyester, etc.) as well as a number of other plastics can be processed using the present technology.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A process for producing a container having a shaped tail, the process comprising:
   providing a preform having a tail;
   blow molding the preform, the blow molding including:
      disposing the preform within a mold cavity of a blow mold, the mold cavity including a channel extending from an end thereof;
      stretching the preform in a longitudinal direction thereof within the mold cavity, wherein the stretching of the preform causes the tail thereof to be inserted axially into the channel of the blow mold, wherein the tail engages a surface defining the channel during progressive axial insertion of the tail into the channel such that the tail conforms to a shape of the channel to form the shaped tail, wherein at least a portion of the channel curves to deviate from extending in the longitudinal direction of stretching of the preform to form a hook shape, thereby causing the shaped tail to include the hook shape;
      injecting a fluid into the preform to expand the preform and form the container having the shaped tail.

2. The process of claim 1, wherein the blow molding comprises injection blow molding.

3. The process of claim 2, wherein the injection blow molding utilizes a gas as the fluid.

4. The process of claim 2, wherein the injection blow molding utilizes a liquid product that remains within the container as an end product as the fluid.

5. The process of claim 1, wherein the channel shapes the tail into a coupling means.

6. The process of claim 1, wherein the channel shapes the tail into a hanging point.

7. The process of claim 1, wherein the blow mold is comprised of a first blow mold portion defining a first portion of the mold cavity and a second blow mold portion defining a second portion of the mold cavity, wherein the channel extends at least partially along a seam where the first blow mold portion engages the second blow mold portion when the blow mold is closed around the preform.

8. The process of claim 7, wherein a first portion of the channel is defined by the first blow mold portion and a second portion of the channel is defined by the second blow mold portion.

9. The process of claim 7, wherein the blow mold is closed with the first blow mold portion engaging the second blow mold portion at the seam prior to the tail being inserted axially into the channel of the blow mold.

10. The process of claim 9, wherein the first blow mold portion and the second blow mold portion do not move relative to one another when the tail is conforming to the shape of the channel to form the shaped tail.

11. The process of claim 1, further comprising a step of heating the tail prior to the step of disposing the preform in the blow mold to promote the tail conforming to the shape of the channel during axial insertion of the tail into the channel.

12. The process of claim 1, wherein the stretching of the preform in the longitudinal direction thereof is performed by a stretch rod extending through an interior of the preform, wherein an axial force applied to the interior of the preform via the stretch rod during the stretching of the preform in the longitudinal direction causes the tail to conform to the shape of the channel to form the shaped tail.

13. The process of claim 12, wherein the stretch rod has a passageway formed therethrough, wherein the passageway includes at least one exit port for injecting the fluid into the preform.

14. The process of claim 1, wherein the hook shape curves through greater than 90 degrees of angular displacement.

15. The process of claim 1, wherein a first portion of the channel first receiving the tail therein extends axially away from the mold cavity and wherein a second portion of the channel formed at an end thereof extends axially towards the mold cavity.

* * * * *